United States Patent Office
3,764,487
Patented Oct. 9, 1973

3,764,487

METHOD OF PLATING PART OF MOLDINGS OF TRANSPARENT POLYSTYRENE SERIES RESINS

Hiroya Yamamoto and Youichiro Tokita, Tokyo, Kenzi Fuziyoshi, Yokohama, Naoatu Kasuga, Kawasaki, and Akiyuki Akamatsu and Hiroo Sakurai, Yokohama, Japan, assignors to Showa Denko K.K., and Toyo Kako Co., Ltd., Tokyo, Japan No Drawing. Filed Mar. 28, 1972, Ser. No. 238,974
Claims priority, application Japan, Mar. 31, 1971, 46/19,082
Int. Cl. B44d 1/52; C23b 5/48, 5/60
U.S. Cl. 204—15 9 Claims

ABSTRACT OF THE DISCLOSURE

A method of plating the desired portions of the surface of moldings of transparent polystyrene series resins which consists in coating said surface portions with a paint mainly formed of high molecular compounds containing fluorine or chlorine; dispersing a solvent with a solubility parameter of 7.0 to 11.0 selected from the group consisting of aromatic hydrocarbons, chlorinated hydrocarbons, alicyclic hydrocarbons, ketones and esters in the water using an interface active agent so as to prepare an emulsion; dipping the molding in such emulsion containing 0.2 to 30 percent by weight of the solvent, warm water and etching solutions in succession; and subjecting the molding first to nonelectrolytic and then to electrolytic plating, thereby depositing a metal film only on the surface portions of the molding other than those coated with the paint.

BACKGROUND OF THE INVENTION

This invention relates to a method of plating part of moldings of transparent polystyrene series resins (hereinafter simply referred to as "polystyrene").

In recent years, there have been increasingly accepted metal plated plastics moldings presenting substantially the same external appearance as die-cast metal articles. Heretofore, however, it has been considered extremely difficult to apply coloring to metal plated plastics molding by printing or painting, thereby to display marks, designs, patterns, etc. The reason is that ordinary printing or painting on a hard, smooth metal plated surface results in the low adhesivity of applied coatings so such coatings readily come off. For improved adhesivity, there is the possibility of applying baked painting. However, synthetic resins permitting plating are generally of thermoplastic type, so that baked painting is not applicable to such resins. The conventional practice, therefore, is to engrave required marks, designs or patterns in the texture of plastics moldings, apply metal plating on said texture and pour paint materials into the depressions formed in the plated surface so as to effect colouring.

With the prior art process, however, paintings simply attach themselves to the metal plated surface of plastics moldings and are not firmly bonded. Accordingly, where the plastics moldings are used under severe conditions or continuously over a long period, paintings are likely to come off. The conventional practice is further handicapped by low manufacturing efficiency and is not adapted for quantity production.

If painting is not applied on the metal plated surface, but on the surface of plastics texture itself, the paint material will have improved adhesivity and be saved from the possibility of coming off. Accordingly, it may be contemplated to apply first printing or painting directly on the surface of plastics texture and then carry out metal plating thereof. However, this process raises various problems for the reasons given below.

The general practice of plating plastics moldings is performed in two steps; that is, first by precipitating a metal layer on the surface of said moldings by chemical plating to render it electrically conductive and then introducing current through said metal coating to apply ordinary electroplating. This chemical plating requires sufficient precipitation of metal and its firm adhesivity to plastics, thus making it necessary to roughen the surface of plastics moldings so as to make it more hydrophilic. Since, however, the surface of plastics is generally extremely hydrophobic as it is, it has to be roughened and made hydrophilic by immersion in an etching solution before it can be subjected to chemical plating. An etching solution for plastics which generally have great chemical resistance should consist of strong oxidizing acids such as a mixture of sulfuric and chromic acids or sulfuric, chromic and phosphoric acids. Such etching solution damages most organic substances so that general ink and paint materials can not withstand a surface roughening treatment using such strong acids, thus either decomposing themselves, or if not destroyed, having their surface as much roughened as that of the plastics texture and most likely plated in the succeeding plating process. Accordingly, the conventional process of directly applying printing or painting to the surface of plastics texture so as to display marks, designs, patterns, etc. in colors and thereafter plating said surface is encountered with the aforementioned difficulties.

One of the present inventors previously developed a method of plating the desired portions of the surface of moldings mainly consisting of a terpolymer of acrylonitrile-butadiene-styrene (hereinafter referred to as "ABS resin") which consisted in printing a paint strongly resistant to an etching solution in advance on the surface of said ABS resin and plating it in such a manner that plated metal was not deposited on the printed portions. Namely, the plating method set forth in the original patent application consisted in coating the desired surface portions of moldings of synthetic resin easily affected by an etching solution, for example, those of ABS with a paint mainly formed of a synthetic resin far less affected by the etching solution than said ABS; dipping the molding in the etching solution; and subjecting the surface of the molding to chemical and electrolytic plating in turn, thereby causing plated metal to be deposited only on the surface portions of the molding other than those coated with the paint. A plated product obtained by this method was little likely to have a paint coating readily come off, because it was directly attached to the surface of the base synthetic resin, and facilitated beautiful complicated printing. However, the ABS resin which itself was opaque presented difficulties in permitting the passage of light when the printed portion was held to the light even where the backside of the molding was not plated. If partial plating could be applied by a similar method to moldings of transparent synthetic resin such as those of transparent polystyrene, then there would be obtained a very attractive product because light could pass through the printed portions, holding out a prospect of being used in wide fields.

Unlike the ABS resin, however, transparent polystyrene series resins, for example, general purpose polystyrene (hereinafter abbreviated as GPPS), copolymers of styreneacrylonitrile, and transparent impact-resistant polystyrene (hereinafter abbreviated as HIPS) containing methyl ester of methacrylic acid and/or small amounts of butadiene contain practically few easily oxidizable double bonds in the molecule and are resistant to an etching solution. With the aforementioned polystyrene series resins, there can not be used such partial plating method as is adapter for the ABS resin. The ABS resin usually containing about 30 to 40 percent by weight of butadiene has a large number of double bonds, which are oxidized by oxidization derived from the etching step preceding nonelectrolytic plating to be converted to a polar group such as a carbonyl group. Furthur, butadiene rubber is dissolved out by acid to roughen the surface of the ABS molding. As the result, a plated layer can be formed with practically sufficient bonding strength during the sensitizing and activating treatments and the succeeding nonelectrolytic plating step. In contrast, the GPPS resin contains few double bonds, and also the transparent HIPS resin has few double bonds, because the proportions of styrenebutadiene rubber (abbreviated as SBR) and butadiene rubber (abbreviated as BR) contained therein amount to about 4 to 5 percent by weight. Therefore, the etching process used with the ABS resin is not well adapted fully to roughen the surface of moldings of said GPPS and HIPS resins, presenting difficulties in effecting nonelectrolytic plating with practically sufficient bonding strength.

SUMMARY OF THE INVENTION

This invention provides a method of plating the desired portions of the surface of moldings of transparent polystyrene which consists in coating said surface portions with a paint mainly formed of high molecular compounds containing fluorine or chlorine; dispersing a solvent with a solubility parameter of 7.0 to 11.0 selected from the group consisting of aromatic hydrocarbons, chlorinated hydrocarbons, alicyclic hydrocarbons, ketones and esters in the using an interface active agent so as to prepare an emulsion; dipping the molding in such emulsion containing 0.3 to 30 percent by weight of the solvent, warm water and etching solutions in succession; and subjecting the molding first to nonelectrolytic and then to electrolytic plating, thereby depositing a metal film only on the surface portions of the molding other than those coated with the paint. This process enables moldings of transparent polystyrene to be plated in part.

DETAILED DESCRIPTION OF THE INVENTION

For the object of this invention, mere etching treatment as used in the case of plating, for example, ABS resin is not sufficient for the previously described reason, but it is necessary to carry out a pretreatment with a water emulsion and a subsequent etching treatment for the processing of the surface of moldings. Accordingly the desired portions of the front surface of polystyrene moldings should be printed in advance with such paints as are not destroyed by these treatments. However, most printing inks in general use are destroyed or decolored by said rigorous treatments and, if not chemically affected thereby, are reduced in adhesivity after plating. Therefore, the paints used in the present invention should be of such type as prevents metal from being deposited thereon in nonelectrolytic plating, and, even after the aforesaid treatments, has a sufficient bonding strength to be free from peeling off when put to adhesivity tests using, for example, cellophane tape. Paints meeting such requirements include those prepared mainly from high molecular compounds containing fluorine or chlorine such as polyvinyl chloride, polyvinylidene chloride, chlorinated polyethylene, chlorinated polypropylene, chlorosulfonated polyethylene, epichlorohydrin polymer, polychloroprene, polyethylene trifluorochloride, polyethylene tetrafluoride, polyvinylidene fluoride and polyvinyl fluoride, derivatives thereof or copolymers constitued by the monomers of all these polymers compounded with other monomers, all dissolved in proper solvents. Particularly polymers and copolymers of vinyl chloride can be favorably used as the base material of paints for this invention. In the case of moldings of GPPS resin, a mixture of polymers or copolymers of vinyl chloride and polypropylene chloride presents excellent adhesivity. Proper solvents for the above-listed paint materials include toluene, cyclohexanone, ethyl acetate and isophorone.

Though there may be used such additives as plasticizers, stabilizers, viscolizing agents and coloring materials with the above-mentioned paints, these additional ingredients rather tend to cause plated metal to be deposited on the surface of the paint coating and should preferably be used in as small amounts as possible, only where required.

When paints as previously defined for the method of this invention are used with coloring materials such as pigments, then symbols, figures and patterns can be printed in color on the surface of moldings. On the other hand, paints free from coloring materials prevent those portions of the surface of polystyrene moldings which are coated with said paints from being plated, though they naturally fail to print, for example, patterns in color on said surface. Where a plate molded from transparent polystyrene has the desired portions of the front side coated with a paint containing a coloring material and all the backside with a transparent paint free from a pigment, then there is obtained a product whose front side is partly plated and whose backside is saved from plating to permit the passage of light. When the plate thus fabrication is held to the light on the backside, the colored portions of the front side are displayed bright as if in relief due to the effect of light, prominently increasing the commercial value of the product.

Where there are drawn the same patterns with a paint containing a coloring material on both front and back sides of polystyrene moldings, the product, when held to the light, permits its passage, provided both coloring material and high molecular compounds constituting the paint are transparent. Accordingly the same patterns on both sides will be superposed on each other, presenting a three-dimensional aspect and in consequence increasing a decorative effect.

The etching operation included in the method of this invention should advisably be carried out in two steps. The first etching step consists in processing the surface of moldings with a mixed treating liquid rich in concentrated sulfuric acid (constsing of, for example, 75 percent by weight of concentrated sulfuric acid and 25 percent by weight of a saturated solution of chromic acid) and the second etching step consists in processing the surface of moldings with a mixed treating liquid rich in chromic acid (consisting of, for example, 200 g./l. of chromic acid as against 15 g./l. of concentrated sulfuric acid). The first etching solution acts to roughen the surface of moldings and the second etching solution is intended to prevent plated metal from being deposited on those portions of said surface where there are drawn pictures, patterns or letters by the action of the concentrated chromic acid of which said second etching solution mainly consists. Accordingly, the second etching solution does not roughen the surface of moldings but is aimed to elevate the selectivity of plating applied according to the method of this invention by keeping the surface portions bearing pictures, patterns or letters free from the deposition of plated metal.

According to the method of this invention, moldings whose desired surface portions are coated with the aforesaid paints are dipped in an emulsion prepared by dispersing a solvent in the water. This solvent is selected from the following group: aromatic hydrocarbons such as benzene, toluene, xylene and ethyl benzene; chlorinated hydrocarbons such as monochlorobenzene, dichlorobenzene, carbon tetrachloride, chloroform, trichloroethane and tetrachloroethane; alicyclic hydrocarbons such as cyclohexane, cyclopentane, ethyl cyclopentane and cyclohexanone; ketones such as acetone, methylethyl ketone and methylisobutyl ketone; and esters such as butyl acetate, diethyl malonate, diethyl phthalate, methyl salicylate and ethyl benzoate. These solvents have the common property that they have a solubility parameter (hereinafter abbreviated as "SP") ranging from 7.0 to 11.0 and permeate polystyrene series resins. Typical among these solvents are monochlorobenzene and toluene. For better surface treatment, it is advised that instead of being used alone, these typical solvents be mixed with another solvent, for example, cyclohexane whose SP value does not appreciably approach the SP value (9.1) of polystyrene with the overall SP value ofthe mixture adjusted to fall within the range of 7.0 to 11.0.

The solubility parameter, as used herein, is defined to mean a measure by which there is indicated the degree of thermodynamically determined mutual solubility between high molecular materials as set forth by J. A. Braydson in "Plastics," December 1961. The solubility parameter is expressed in the unit of (cals./sec.)$^{1/2}$. High molecular materials whose SP values are close to each other are mutually soluble and those whose SP values are widely apart are mutually insoluble. This tendency is also observed between high molecular materials and solvents. Therefore it may be generalized that solvents whose SP values approach that of polystyrene easily permeate it to reduce treating time. Conversely, solvents whose SP values are widely apart from that of polystyrene require longer treating time, but facilitate control of treatment by that extent. Accordingly, it is desired to use a mixed solvent whose overall SP value has been adjusted to fall within the range of 7.0 to 11.0.

For dispersion of the aforesaid solvent in the water to prepare an emulsion, there is used according to this invention an interface active agent generally in amounts of 0.1 to 30 percent by weight based on the solvent. For the purpose of the invention there may be used any type of surfactant, regardless of whether it is nonionic, cationic or anionic. Preferable, however, are combinations of nonionic and anionic surface active agents. The solvent is added to such extent that its content is an emulsion prepared ranges between 0.3 to 30 percent by weight.

Referring now to the solvent, its dispersed amount of less than 0.2 percent by weight fails to attain the effect of this invention, that is, the desired surface treatment. Conversely where, the content of the solvent exceeds 30 percent by weight, then emulsion particles will be rendered excessively coarse. If the surface of polystyrene moldings is treated with such emulsion, then it will be too much roughened to provide a smooth plated plane, possibly decreasing the adhesivity of plated metal. Therefore it is required that the content of the solvent present in the form of emulsion particles be limited to the aforesaid range.

All the emulsion particles are chosen to have a size of less than 1 micron. Coarse particles larger than 10 microns are not favorable to obtain a smooth plated plane. Emulsion particle sizes should most preferably be so controlled as to fall within the range of 0.2 to 0.5 micron.

The surface of polystyrene moldings pretreated with said emulsion is water washed to remove said emulsion, thereby preventing the contamination of the etching solution used in the succeeding treatment which might otherwise occur by entrainment of said emulsion. In the plating of the surface of polystyrene moldings, their immersion in the above-mentioned emulsion is not primarily aimed to roughen the surface, but to impregnate it with the solvent acting as an oxidation promoter during the succeeding treatment with an etching solution consisting of, for example, a mixture of sulfuric acid and dichromic acid.

To effect the favorable progress of said oxidation erosion reaction, it is necessary properly to adjust the concentration and distribution of the solvent impregnated near the surface of the molding. To this end, said concentration should range between 0.02 and 0.15 mg./cm.$^2$, or preferably between 0.05 and 0.1 mg./cm.$^2$. If good adjustment is not carried out, that is, there is present little solvent near the molding surface, then the oxidation erosion reaction will take place only slightly in contact with the etching solution, with the result that the molding surface is too little roughened to attain the full adhesivity of plated metal thereto. Consequently, where there is used an excessively concentrated solvent, the molding surface will be unduly roughened due to the resultant vigorous reaction, leading to not only the decreased commercial value of the product, but also the deterioration of the base polymer itself and in consequence the reduced adhesivity of plated metal. As apparent from the foregoing description, ordinary water washing after immersion of the molding in the emulsion does not attain the desired object, so that the molding should be dipped in stirred warm water at a temperature of 20° to 90° C. or preferably 60° to 70° C. for such length of time as well matches the time the molding was previously dipped in the emulsion. To maintain the suitable concentration and distribution of a solvent impregnated near the surface of the molding, the time of dipping the molding in said emulsion should be so controlled as to bear a proper balance with the concentration of the solvent in the emulsion, as well as with the temperature and stirred condition of warm water used in washing. The pretreatment with said emulsion and the subsequent treatment with etching solutions render the surface of polystyrene moldings adapted for nonelectrolytic plating. The aforementioned special surface treatments used in the method of this invention attain an increased area of true contact between the plated metal film and the molding surface and a larger growth of functional groups and in consequence the stronger adhesivity of said metal film.

The etching solution is prepared from the mixture of sulfuric acid and dichromic acid or sulfuric acid and chromic acid or sulfuric acid, chromic acid and phosphoric acid.

Nonelectrolytic plating of moldings of transparent polystyrene whose surface has been processed as described above, may be effected in the same manner as in the case of the ABS resin. Namely, after coated with a prescribed paint, and subjected to surface treatment with the above-mentioned emulsion and etching solutions used in the later described examples, the polystyrene molding is water washed, further undergoes sensitizing and activating treatments and has a reducing agent and palladium metal adsorbed to the surface. When there is applied chemical nonelectrolytic plating, the surface portions of the polystyrene molding other than those coated with the paint are provided with a plated film. Later when the molding is further subjected to electrolytic plating by the customary process, then there are electrolytically plated films of copper and other metals on the metal film nonelectrolytically plated in advance.

According to the method of this invention, there is not plated any metal on the paint-coated surface portions of polystyrene moldings which represent pictures, patterns or letters.

As mentioned above, the method of this invention enables paint coatings representing pictures, patterns or letters to be tightly adhered to the surface of polystyrene moldings free from peeling off over a long period of used. Further, a plated film on the surface portions of the polystyrene moldings other than those bearing such patterns has an extremely great adhesivity, enabling plating to be effected with a practically sufficient peel strength of 1000 to 2000 g./cm. even on the GPPS and transparent HIPS resins which have heretofore presented difficulties in plating metals thereon with a practically full bonding strength. Accordingly, the method of this invention provides attractive polystyrene moldings permitting the partial passage of light which can be used widely, for example, in the field of advertisement.

This invention will be more fully understood by reference to the examples which follow.

EXAMPLE 1

Pellets of the GPPS resin (a product commercially known as "Esbright #8") were molded into a transparent rectangular plate 3 mm. thick using a 4 oz. screw in-line type injection molding machine. On the front side of the molded plate was screen printed a paint consisting of a mixture of 30 parts of vinyl chloride-vinyl acetate copolymer (a product manufactured by the U.C.C. Company of U.S.A. under a commercial name of "Vinylite VYHH"), 7 parts of a pigment, 15 parts of toluene, 25 parts of cyclohexanone, 30 parts of ethyl acetate and 30 parts of isophoron. The backside of the plate was coated all over with a transparent paint prepared from the same composition as that of the above-mentioned paint except for the pigment. A picture drawn with the paint on the front side of the plate was fixed by drying it about 3 hours at 60° C.

The plate was dipped one minute at normal temperature in an emulsion consisting of 18 percent by weight of a solvent prepared from 1.5 parts of toluene, 1 part monochlorobenzene and 2.5 parts of cyclohexane, 4 percent by weight of a nonionic interface active agent (a product manufactured by the Japan Fats and Oils Company under a commercial name of "Nissan NS–210") and water as the remainder. Immediately after, the plate was dipped 10 minutes in warm water at 70 °C. and then 10 minutes at 70° C. in a first etching solution formed of 4200 parts of sulfuric acid (density 1.84), 100 parts of anhydrous chromic acid and 1070 parts of water. After water washing, the plate was dipped 10 minutes at 60° C. in a second etching solution consisting of 200 parts of sulfuric acid (density 1.84), 400 parts of anhydrous chromic acid and 800 parts of water to complete the etching operation. After full water washing, the plate was dipped 10 minutes at normal temperature in a sensitizing solution prepared by dissolving 10 parts of stannous chloride in a mixture of 1000 parts of water and 5 parts of hydrochloric acid so as to be sensitized and then 5 minutes in an activating solution prepared by dissolving 0.5 part of palladium chloride in a solution consisting of a mixture of 1000 parts of water and 10 parts of hydrochloric acid so as to have the surface activated.

The plate thus processed was further chemically plated with copper by being diped 5 to 30 minutes in a chemical copper plating solution. Said copper plating solution was prepared from 10 g. of copper sulfate, 25 g. Rochelle salt, 10 g. of caustic soda, 10 g. of paraformaldehyde and sufficient amounts of water to bring the entire solution to one liter. After completion of chemical copper plating, said plated copper was further coated with copper, nickel and chromium by the customary electrolytic process. This electrolytic plating was carried out under the following conditions:

| | Composition of electrolyte | Plating conditions |
|---|---|---|
| Electrolytic plating of copper. | Copper sulfate, 220 g./l | Temperature, 18–22° C. |
| | Sulfuric acid, 50 g./l | Cathode current density, 3.5 to 6.5 A/dm.$^2$ |
| | Hydrochloric acid, 50 g./l | Anode current density, 1.8 to 3.5 A/dm.$^2$ |
| | | Baume degree, 20° Be. |
| | Lustering agent, 5 g./l | Duration of power supply, 20 min. |
| Electrolytic plating of nickel. | Nickel sulfate, 260 g./l | pH temperature, 3.8 to 4.2. |
| | Nicket chloride, 50 g./l | Temperature, 53 to 55° C. |
| | Boric acid, 50 g./l | Cathode current density, 1 to 5 A/dm.$^2$ |
| | Sodium naphthalene trisulfonate, 5 g./l. | Baume degree, 26 to 29° Be. |
| | | Duration of power supply, 10 min. |
| Electrolytic plating of chromium. | Chromic acid, 250 g./l | Temperature, 43 to 45° C. |
| | Sulfuric acid, 2.5 g./l | Current density, 10 to 40 A/dm.$^2$ |
| | Selenic acid, 0.013 g./l | Baume degree, 25–27° Be. |
| | | Duration of power supply, 3 min. |

After plating, the nonpainted portions of the front side of the rectangular plate were plated, while the portions printed with the aforesaid paint were free from plating. Further, the backside of the plate was not plated at all. The plated film had a peel strength of 2000 g./cm.

When held to the light on the backside, the molded plate of polystyrene partially plated as described above permitted the passage of light through the printed portions of the front side to present them bright as if in relief, thus displaying great attractiveness.

EXAMPLE 2

On the front side of a plate molded from the same GPPS resin as used in Example 1 was screen printed a paint prepared from a mixture of 20 parts of vinyl chloride-vinyl acetate copolymer (a product manufactured by the U.C.C. Company of U.S.A. under a commercial name of "Vinylite VYHH"), 4 parts of polyethylene trifluorochloride, 15 parts of chlorinated polypropylene, 1 part of chlorosulfonated polyethylene, 10 parts of pigment, 30 parts of toluene, 25 parts of cyclohexanone, 30 parts of ethyl acetate and 15 parts of isophoron. The backside of the plate was coated all over with a transparent paint formed of the same composition as that of the above-mentioned paint except for the pigment. A picture drawn with the paint on the front side of the plate was fixed by drying it about 3 hours at 60° C. This picture bearing plate was dipped 1 minute at normal temperature in an emulsion prepared by dispersing 2 g. of benzene, 2 g. of cyclohexanone and 1 g. of methylethyl ketone together with an interface active agent in 400 cc. of water. After washing with warm water at 70° C. by being dipped therein, the plate was dipped 10 minutes at 70° C. in a first etching solution consisting of 4000 g. of sulfuric acid (density 1.84), 1070 g. of water and 100 g. of chromic acid and then 5 minutes at 65° C. in a second etching solution formed of 200 g. of sulfuric acid (density 1.84), 900 g. of water and 400 g. of chromic acid to complete the etching operation. Thereafter, the plate was dipped 5 minutes in a sensitizing solution consisting of 20 g./l. of stannous chloride and 10 cc./l. of hydrochloric acid for sensitization and, after water washed, further dipped 3 minutes in an activation solution prepared from 0.25 g./l. of palladium chloride and 2 cc./l. of hydrochloric acid. The plate was dipped 10 minutes at 40 to 50° C. in a chemical nickel plating bath consisting of 20 g./l. of nickel sulfate, 15 g./l. of sodium thiophosphate, 50 g./l. of ammonium sulfate and 20 g./l. of sodium citrate for chemical nickel plating. After completion of chemical nickel plating, the plate was further electrolytically plated with nickel, copper and chromium as in Example 1. As the result, the plate was partly plated on the front side, but not on the backside as in Example 1.

EXAMPLE 3

A plate molded from the same GPPS resin as used in Example 1 was partly plated in the same manner, excepting that the paint used consisted of 25 parts of vinyl chloride-vinyl acetate copolymer (a product manufactured by the U.C.C. Company of U.S.A. under a commercial name of "Vinylite VYHH"), 3 parts of polyvinylidene fluoride, 5 parts of chlorinated polyethylene, 10 parts of pigment (the paint coated on the backside of the plate did not contain this pigment), 30 parts of toluene, 25 parts of cyclohexanone, 30 parts of ethyl acetate and 15 parts of isophoron, obtaining the same kind of product as in Example 1.

EXAMPLE 4

A plate molded from transparent HIPS resin containing 5 percent of butadiene was partly plated in the same manner as in Example 1, excepting that the paint used was prepared from 20 parts of polyvinyl chloride, 5 parts of chlorinated polypropylene, 5 parts of polyvinylidene chloride, 10 parts of pigment (the paint coated on the backside of the plate did not contain this pigment), 30 parts of toluene, 25 parts of cyclohexanone, 30 parts of ethyl acetate and 15 parts of isophoron, obtaining the same kind of product as in Example 1.

An article molded from acrylonitrile-styrene copolymer (containing 28 percent of acrylonitrile) was partly plated in the same manner as described above, obtaining the same result.

What is claimed is:

1. A method of plating part of moldings of transparent polystyrene series resins which consists in coating the desired portions of the surface of the molding with a paint mainly consisting of high molecular compounds containing fluorine or chlorine; emulsifying a solvent with a solubility parameter of 7.0 to 11.0 selected from the group consisting of aromatic hydrocarbons, chlorinated hydrocarbons, alicyclic hydrocarbons, ketones, esters, and mixtures thereof in the water using an interface active agent; dipping the surface of the molding in such emulsion containing 0.2 to 30 percent by weight of said solvent to impregnate the uncoated surface of said molding with said solvent; washing the solvent impregnated molding in warm water; immersing the washed molding in etching solution and then subjecting the molding first to nonelectrolytic and then electrolytic plating, thereby depositing a metal film only on the surface portions of the plate other than those coated with said paint.

2. A method according to claim 1 wherein the concentration of the solvent impregnated in the uncoated surface of the molding ranges between 0.02 and 0.15 mg./cm.$^2$.

3. A method according to claim 1 wherein the transparent polystyrene series resins are selected from the group consisting of general purpose polystyrene, styrene-acrylonitrile copolymer, and transparent impact-resistant polystyrene.

4. A method according to claim 1 wherein said etching solution is selected from the group consisting of a mixture of sulfuric acid and dichromic acid; or sulfuric acid and chromic acid.

5. A method according to claim 1 wherein said solvent is applied to said molding as an emulsion in water in which the emulsion particles of solvent have a size less than 1 micron.

6. A method according to claim 1 wherein said washing of the solvent impregnated molding is with water having a temperature of about 60 to 70° C. for a time at least equal to the time the molding was previously dipped in said emulsion.

7. A method according to claim 1 wherein the paint contains pigments.

8. A method according to claim 1 wherein the high molecular compounds containing fluorine or chlorine are selected from the group consisting of polyvinyl chloride, polyvinylidene chloride, chlorinated polyethylene, chlorinated polypropylene, chlorosulfonated polyethylene, polymers of epichlorohydrin, polychloroprene, polyethylene trifluorochloride, polyethylene trifluoride, polyethylene tetrafluoride, polyvinylidene fluoride and polyvinyl fluoride, derivatives of these polymers, and copolymers composed of the monomers constituting said polymers and other monomers.

9. A method according to claim 1 wherein the paint is applied on the front side of moldings of transparent polystyrene series resins in the form of a pattern.

References Cited

UNITED STATES PATENTS

| | | | |
|---|---|---|---|
| 3,591,352 | 7/1971 | Kennedy et al. | 204—15 |
| 3,592,744 | 7/1971 | Grunwald et al. | 204—20 |
| 3,370,974 | 2/1968 | Hepfer | 117—47 A |

THOMAS TUFARIELLO, Primary Examiner

U.S. Cl. X.R.

117—47 A; 204—20